Dec. 27, 1960
C. J. GLANZER
2,966,231
STACK TYPE OIL BATH FILTER
Filed Feb. 13, 1959
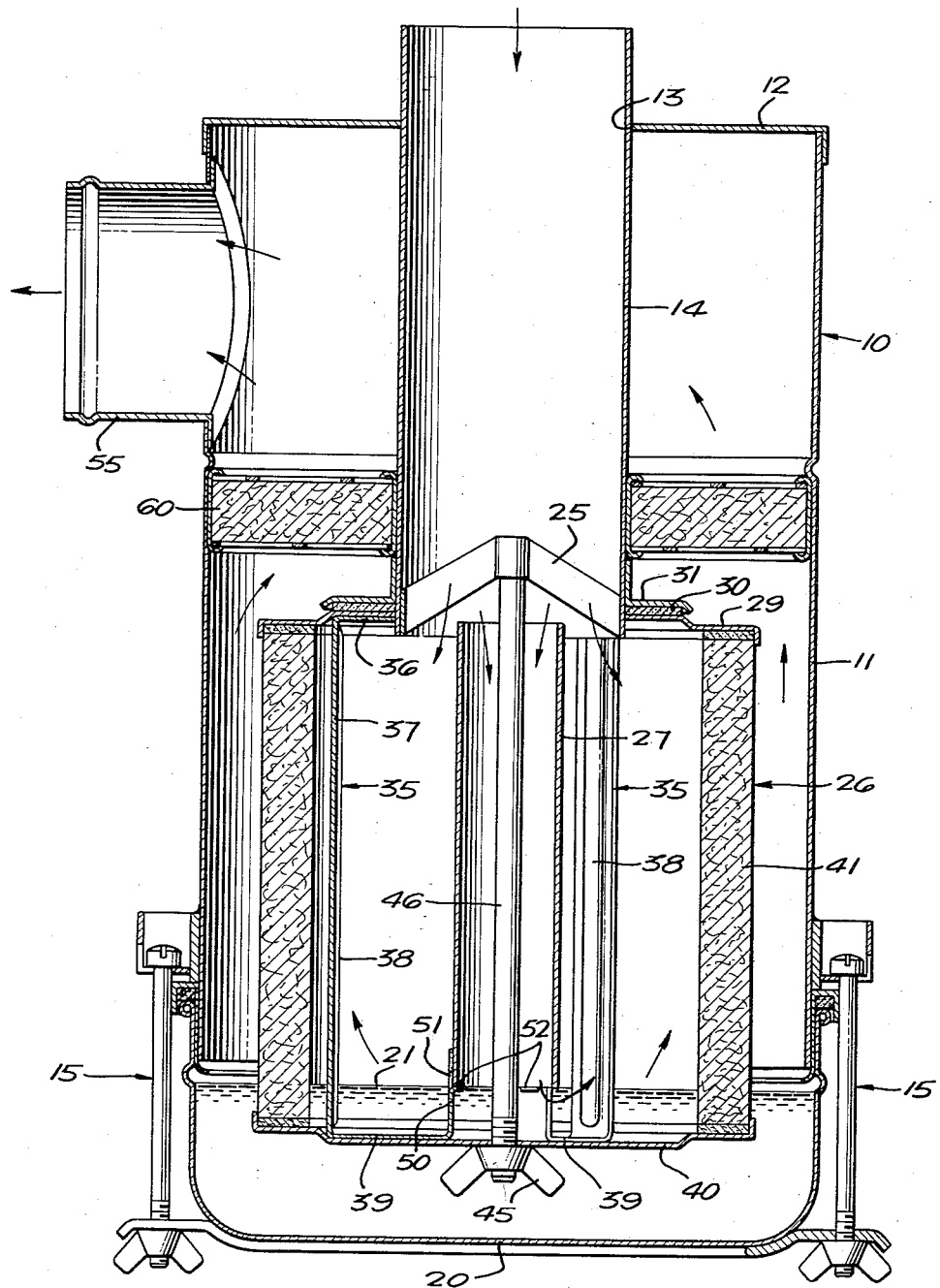
INVENTOR.
CLARENCE J. GLANZER
BY
ATTORNEYS United States Patent Office 2,966,231
Patented Dec. 27, 1960

2,966,231
STACK TYPE OIL BATH FILTER

Clarence J. Glanzer, Hermosa Beach, Calif., assignor to Farr Company, El Segundo, Calif., a corporation of California Filed Feb. 13, 1959, Ser. No. 793,137

5 Claims. (Cl. 183—12)

This invention relates to air cleaners and has particular reference to an oil bath air filter of the stack type for employment on engines such as internal combustion engines, air compressors, blowers and the like for preventing entry thereinto of dust and other contaminants in the atmosphere.

A primary object of the present invention is to provide a novel oil bath air filter of the stack type including novel means for control of the oil circulation with minimum resistance to air flow.

Another object of the present invention is to provide a novel stack type oil bath air filter wherein the oil washing action increases in proportion to the flow of air therethrough.

A further object of this invention is to provide a stack type oil bath air filter wherein oil washing action is obtained regardless of the angle of operation of the unit to which the filter is attached.

Stack type oil bath air filters are generally employed when it is desired to install the filter in a position, usually close to the engine or compressor, where it can be readily serviced, yet where a stack extension can be attached so that the air intake is above the cloud of dust stirred up by movement of the equipment. This necessarily means that all of the air entering the assembly is drawn through a relatively small diameter stack at relatively high velocity. In conventional stack type filters, the stack extends through the filter element or elements and terminates at the level of oil in the oil sump, where the entire volume of high velocity air is directed against the oil in the sump, causing it to become agitated and to break up into droplet form which is entrained in the air and thereby delivered to the filter element. This design requires that all of the air must turn through an angle of approximately 180° over the bottom lip of the stack, resulting in appreciable pressure losses which adversely affect the performance or efficiency of the unit on which the filter assembly is utilized.

Another disadvantage inherent in the design of conventional stack type filters is that they are constructed so as to prevent entrainment or carry-over of oil into the clean air stream emerging from the filter element, but this necessary and desirable result is accomplished by isolating a small body of oil immediately below the stack outlet so that only a portion of the oil is subject to being agitated and carried into the air stream going to the filter element. This results in a minimum amount of oil washing action at the time the filter is handling its heaviest dust load.

A further object of the present invention is, therefore, to provide a novel stack type oil bath air filter which is not subject to the above and other disadvantages of the prior art.

Other objects and advantages of this invention it is believed will be readily apparent from the following detailed description of a preferred embodiment thereof when read in connection with the accompanying drawing.

In the drawing:

The single figure is a vertical sectional elevation of the filter of the present invention.

Referring now to the drawing, the oil bath filter 10 of the present invention includes a generally cylindrical housing 11 having a top wall 12 provided with a central opening 13 in which is received a conduit or stack 14 for incoming air. Secured to the bottom of the housing by means of the clamp members 15 is a bowl-shaped oil sump 20 containing oil to the level 21.

The stack 14 terminates substantially centrally of the housing 11 and secured internally thereof at the lower end is a spider 25 which supports the filter element assembly 26 and secondary air conduit 27.

The filter element assembly 26 includes an annular top wall 29 encompassing the lower end of the stack 14, an annular gasket member 30 being interposed between the upper side of the wall 29 and the lower side of a flange member 31 secured to the stack 14. Three spacer members 35, equally spaced apart, are provided, each having a horizontal portion 36 secured to the underside of the top wall 29 and each having a vertical portion 37 provided with a central strengthening rib 38. Each of the spacer members is provided with a lower horizontal portion 39 secured to a bottom wall 40. Interposed between the top wall 29 and bottom wall 40 is a tubular air filter-element 41 of the conventional oil separation media type. The filter element assembly is maintained in the assembled relation by means of a wing nut element 45 which is connected to a bolt member 46 carried at its upper end by the spider 25, the lower end of the bolt member extending through a central opening in the bottom wall 40.

The secondary air conduit 27, which has a diameter roughly one-half the diameter of the stack 14 is mounted co-axially of the stack with the upper end extending into the lower open end of the stack. The lower end of the conduit 27 stops just short of the oil level 21. The conduit 27 is supported in place by means of the spacer members 35, these members being provided with vertical arms 50 the upper portions of which are secured to the outer wall of the conduit. Each of the arms 50 is provided with a central slot 51 and a horizontally-bent portion 52 upon which the lower edge of the conduit is rested.

The housing 11 is provided with an air outlet conduit 55 extending outwardly from the side thereof. Permanently mounted below the air outlet and above the filter element assembly 26 is an auxiliary filter element 60, annular in shape and filling the annular space between the housing 11 and the stack 14. The sole purpose of the element 60 is to protect against passage of dust or other contamination into the outlet 55 during the time the filter 10 is disassembled for cleaning or repair.

In operation of the device thus described, the incoming air enters the stack 14 at the upper open end thereof and is drawn downwardly through the stack. The major portion of the air passes into the annular space between the secondary air conduit 27 and the filter element 41, from whence it is drawn through the filter element, flowing generally horizontally therethrough, i.e., in directions normal to the axis of the tubular filter element. At the same time, a portion of the air is drawn downwardly through the secondary air conduit 27 and thence under the normal level of the oil, causing the oil to be agitated and to entrain in the air droplets of oil which are carried thereby upwardly and deposited on the filter element 41. The dust-laden oil in the filter element continuously falls by gravity through the filter element and drains back into the sump.

The clean air emerging from the filter 41 is drawn upwardly through the auxiliary filter element 60 and thence out the outlet 55 and into the engine (not shown) or other mechanism to which the filter is attached.

From the above description it is believed evident that as the total volume of incoming air increases through the range of air demand, the volume directed to the oil sump via the secondary air conduit will increase in direct proportion to the ratio of the areas of the stack and the secondary air conduit. This will result in increased agitation of the oil and maximum washing action at maximum air flow.

The device of the present invention has several other important advantages over those heretofore proposed. For example, the tubular shape of the filter element presents more than twice the area of filter media to the air stream, as compared to the conventional type wherein the air must pass through the entire vertical dimension of the filter. Accordingly, the velocity of the air through the filter element of the present invention is less than half that through the conventional type, thus reducing the possibility of entrainment of oil in the clean air coming out of the filter element and permitting the collected oil and dust to properly drain from the filter media. Similarly, due to flow of the air from the interior of the tubular element to the exterior, each successive layer of filter media increases in area, causing an additional decrease in velocity per square inch of filter media with the minimum velocity at the outside layer where entrainment might take place. Moreover, the direction of air flow being at right angles to the direction of oil drainage, rather than directly counter-current thereto, results in a lesser impediment to proper drainage.

In existing stack type filters the oil control means is substantially empty during maximum air demand when the filter is in a vertical position. However, at angular operation the level of the oil changes and the head of oil on one side of the control means increases to a height greater than that of the oil control means. This results in additional oil being placed in action with resultant flooding of the element and carry-over. In the construction of the present invention there is identical washing action under all angles of operation.

Having fully described my invention, it is to be understood that I do not wish to be limited to the details set forth, but my invention is of the full scope of the appended claims.

I claim:

1. A stack type oil bath filter comprising a generally cylindrical housing having a top wall, an oil sump connected to the bottom of said housing, a stack extending downwardly through said top wall, a secondary air conduit mounted in said housing generally co-axial with said stack, the upper end of said secondary air conduit being adjacent the lower end of said stack and the lower end of said secondary air conduit extending adjacent the oil level in said sump, the diameter of said secondary air conduit being substantially less than the diameter of said stack, and a tubular filter element mounted in said housing in position to receive air directly from said stack and to receive air containing oil droplets therein from the bottom of said secondary air conduit.

2. A stack type oil bath filter comprising a generally cylindrical housing having a top wall, an oil sump connected to the bottom of said housing, a stack extending downwardly through said top wall, a secondary air conduit mounted in said housing generally co-axial with said stack, the upper end of said secondary air conduit extending into the lower end of said stack and the lower end of said secondary air conduit extending adjacent the oil level in said sump, the diameter of said secondary air conduit being substantially less than the diameter of said stack, and a tubular filter element mounted in said housing generally coaxial with said stack in position to receive air directly from said stack and to receive air containing oil droplets therein from the bottom of said secondary air conduit, said tubular filter element surrounding said secondary air conduit and having an inside diameter substantially greater than the diameter of said stack.

3. A stack type oil bath filter comprising a generally cylindrical housing having a top wall, an oil sump connected to the bottom of said housing, a stack extending downwardly through said top wall, a secondary air conduit mounted in said housing generally co-axial with said stack, the upper end of said secondary air conduit being adjacent the lower end of said stack and the lower end of said secondary air conduit extending adjacent the oil level in said sump, the diameter of said secondary air conduit being about one-half the diameter of said stack, and a tubular filter element mounted in said housing in position to receive air directly from said stack and to receive air containing oil droplets therein from the bottom of said secondary air conduit.

4. A stack type oil bath filter comprising a generally cylindrical housing having a top wall, an oil sump connected to the bottom of said housing, a stack extending downwardly through said top wall, a secondary air conduit mounted in said housing generally co-axial with said stack, the upper end of said secondary air conduit being adjacent the lower end of said stack and the lower end of said secondary air conduit extending adjacent the oil level in said sump, the diameter of said secondary air conduit being about one-half the diameter of said stack, and a tubular filter element surrounding said secondary air conduit in position to receive air directly from said stack and to receive air containing oil droplets therein from the bottom of said secondary air conduit.

5. A stack type oil bath filter comprising a generally cylindrical housing having a top wall, an oil sump connected to the bottom of said housing, a stack extending downwardly through said top wall, a secondary air conduit mounted in said housing generally co-axial with said stack, the upper end of said secondary air conduit extending into the lower end of said stack and the lower end of said secondary air conduit extending adjacent the oil level in said sump, the diameter of said secondary air conduit being about one-half the diameter of said stack, and a tubular filter element surrounding said secondary air conduit in position to receive air directly from said stack and to receive air containing oil droplets therein from the bottom of said secondary air conduit.

References Cited in the file of this patent

UNITED STATES PATENTS

| | | |
|---|---|---|
| 2,171,752 | Kamrath | Sept. 5, 1939 |
| 2,490,959 | Gregory | Dec. 13, 1949 |

FOREIGN PATENTS

| | | |
|---|---|---|
| 532,863 | Great Britain | Feb. 3, 1941 |
| 1,075,697 | France | Apr. 14, 1954 |
| 944,405 | Germany | June 14, 1956 |